United States Patent [19]

Fitzgerald

[11] 4,312,577
[45] Jan. 26, 1982

[54] MOTOR VEHICLE MAP DISPLAY SYSTEM

[76] Inventor: J. Vincent Fitzgerald, 106 Norris Ave., Metuchen, N.J. 08840

[21] Appl. No.: 66,487

[22] Filed: Aug. 13, 1979

[51] Int. Cl.³ .................. G01C 22/02; G03B 21/00
[52] U.S. Cl. ................................. 353/12; 364/424; 364/444
[58] Field of Search .............. 353/12, 11; 364/424, 364/444

[56] References Cited

U.S. PATENT DOCUMENTS

| 2,548,488 | 4/1951 | Mella | 353/12 |
| 2,960,906 | 11/1960 | Fogel | 353/12 |
| 3,208,336 | 9/1965 | Vago | 353/12 |
| 3,359,408 | 12/1967 | Briggs | 353/12 |
| 4,033,684 | 7/1977 | Totiumi et al. | 353/27 A |
| 4,138,726 | 2/1979 | Girault et al. | 353/12 |
| 4,152,722 | 5/1979 | Inuiya et al. | 353/27 A |
| 4,174,889 | 11/1979 | Peters | 353/12 |

Primary Examiner—Steven L. Stephan

[57] ABSTRACT

A map display system for an automobile, in which a map is projected on a screen by optical magnification of a portion of a map disposed on a movable slide. A portion of the slide contains a list of locations such as cities, governmental institutions and points of interest, with an optical positioning code adjacent to each item of the list. Means is provided for automatically positioning the slide to display a selected location on the list, and for showing successive locations on the display in accordance with a prearranged itinerary as the automobile traverses the locations.

26 Claims, 13 Drawing Figures (SHEET 1.)

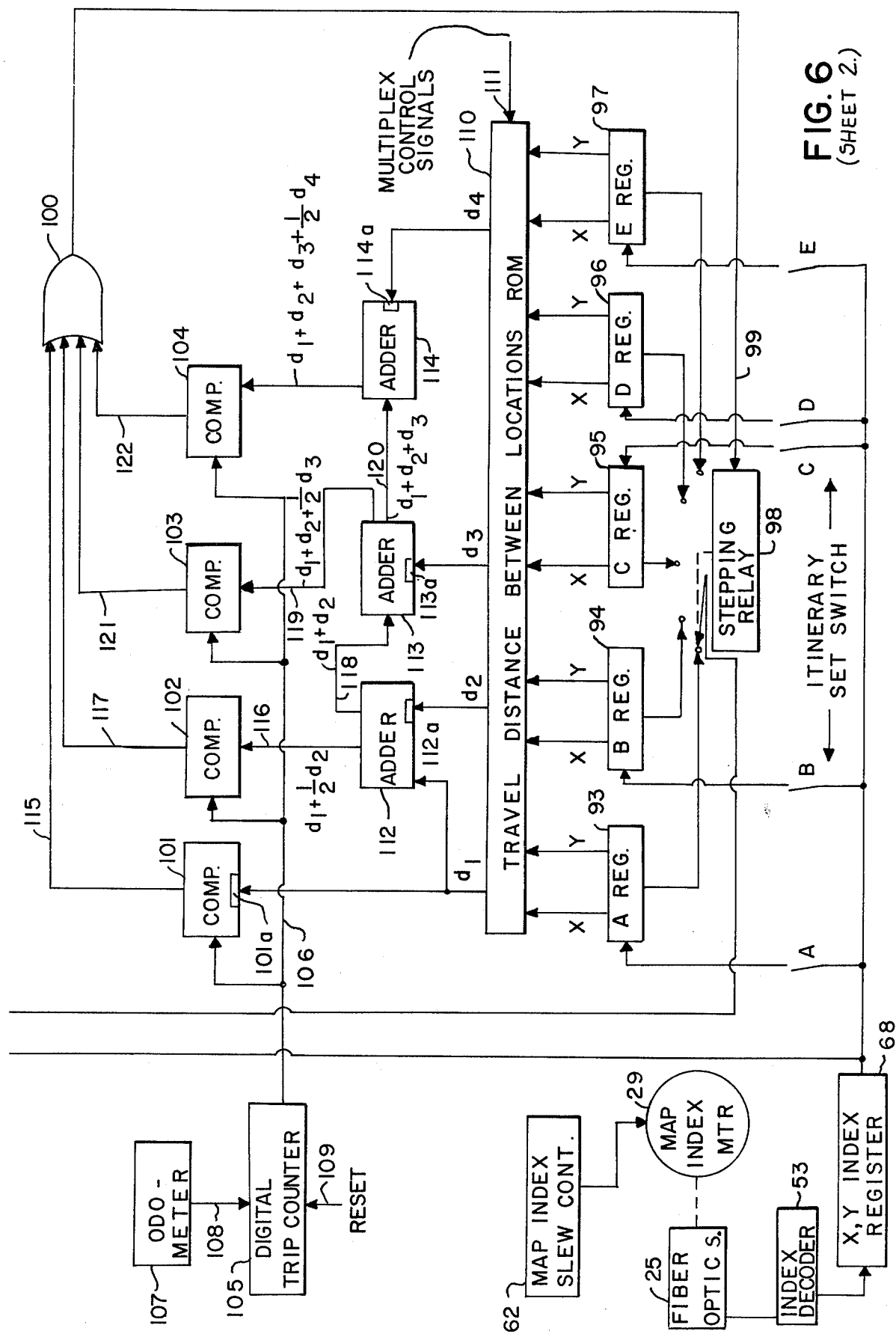
FIG. 6 (SHEET 2.)

MOTOR VEHICLE MAP DISPLAY SYSTEM

This invention relates to a map display system for a motor vehicle.

The cost and availability of road maps for automobiles are making it more expensive and difficult to obtain such maps. Where a trip of substantial length is contemplated, several road maps must be obtained and kept in the relatively small glove compartment of the automobile. Every time reference to a map is required, the glove compartment must be opened, the desired map found and removed, opened, and unfolded to expose the region of the map to be looked at.

This procedure is time consuming, cumbersome and wasteful of fuel, in that the engine is usually kept idling while the aforementioned steps are carried out.

Accordingly, an object of the present invention is to provide a map display for a motor vehicle, which overcomes the aforementioned difficulties, and which may be provided with additional features to facilitate the navigation of an automobile trip.

Various types of map display systems are known in the art for use in aircraft and ships, and for educational purposes. For example, U.S. Pat. No. 3,473,227 shows a film projection system with a movable index and associated circuitry for measuring distance to a target; U.S. Pat. No. 3,175,460 shows a computer driven map display for navigation purposes; U.S. Pat. No. 3,865,477 describes a projection map display with navigational plotting features; U.S. Pat. No. 3,724,079 describes a mechanical navigational chart display and plotting device; U.S. Pat. No. 2,957,389 covers an optical light beam pointer for screen projection images; and U.S. Pat. No. 1,704,811 relates to a map projector with a movable pointer.

Projection microscopes now in use employ optical and related elements such as a slide holder, manually positionable mechanical stage, screen and projection lamp. However, such microscopes are especially designed for research investigation of highly magnified views of polished specimens of minerals and thin sections of embedded biological materials. Projection microscopes of relatively low power are employed in the fabrication of opaque solid state electronic components. Microfiche projectors are limited to the viewing of standard size black and white (positive or negative) transparencies of whole pages of printed books or documents. These widely used microprojection systems are not suitable for projecting tiny regions of colored micro highway maps onto screens where they can be monitored by drivers of vibrating and moving vehicles. Nor are they suitable for driver location of cities and for following highways and streets under daylight and night-time conditions.

An embodiment of the invention herein described provides a map display system for a motor vehicle, the system being housed for mounting in the automobile dashboard or being portable. The map display system comprises: a slide holder into which a translucent slide may be removably inserted; a slide for mounting in said holder, said slide comprising a greatly reduced translucent microhighway or microstreet map encompassing a large area; control means for positioning and centering any minute region of the map and for continuously moving the map in order to display highway and street details traversing adjacent regions thereof; a display screen; and optical projection means for displaying a greatly magnified image of said minute region on said screen. Means may be provided for (i) illuminating the micromap to render it visible in daylight and at night, and/or for (ii) tilting the principal optic axis of said projection means to position the plane of the screen at a desired viewing angle.

As also herein described, there is provided a map display system for a motor vehicle, comprising: a slide holder for a slide having (i) a map portion comprising a projectable highway map and (ii) an index portion comprising a list of locations and a coordinate position code corresponding to each location of said list; optical map projection means for displaying a magnified image of a selected part of the map portion of said slide; coordinate control servomechanism means for positioning said slide holder and optical map projection means with relation to each other in accordance with X-position and Y-position coordinate control signals; index designating means for designating at least one selected item of said list of locations; index decoding means coupled to said index portion of said slide and responsive to said coordinate position code for generating X-position and Y-position coordinate designation signals corresponding to said selected item; an index register for storing said coordinate designation signals; and means coupled to said index register and operative in a location display mode of said system for generating said coordinate control signals to cause said slide holder to move to a position in which a location corresponding to said selected item of said list is displayed on said screen.

Thus a driver can operate the micro highway map display system in a moving vehicle and can instantly locate cities, towns, streets and highways by means of convenient controls. He can display or extinguish the map image at will. In other words this map display system provides a conveniently visible highway map for viewing by the driver, and for informing the driver in the same manner that he views and is informed by his vehicle's other dashboard accessories such as odometer, speedometer, digital display multifunction trip computer, radio dial and digital display, clock and fuel gage.

Figure 1:
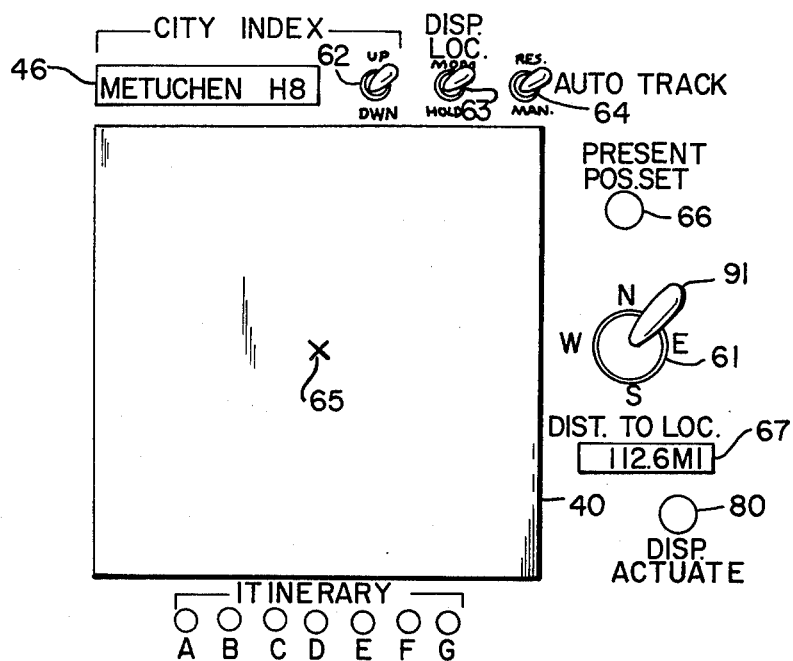
FIG. 1 shows the console and display screens of a map display system according to a preferred embodiment of the invention.

A typical microhighway map according to the present invention may be about 25 by 35 mm. in size and correspond to an area of about 100 by 140 miles. The tiny (circular, square or rectangular) region selected by the driver for magnification and projection may be as small as 0.5 to 2 mm. in diameter (or larger or smaller if so desired). The image the driver views may cover an area of the map corresponding to about 1.5 to 6 miles in diameter. However, the driver can move the map and follow a highway from city to city anywhere in the 100 by 140 mile area. The micro highway map may be serveral times larger, if so desired, e.g. covering an area of 400 by 560 miles.

The need for a map display system for automotive vehicles has been evident for a long time, but a practical system meeting the required economic and performance constraints has not heretofore been devised. Such requirements include the projection of an image closely corresponding in color and detail to the familiar road maps presently used by motorists.

Types of photographic film that appear to make good road maps include Ektachrome 160 and Kodachrome 40 Type A, produced by the Eastman Kodak Company of Rochester, New York.

Although almost any 35 mm. slide transparency of a road map will satisfactorily project onto an auditorium screen by means of a commercial 35 mm. slide projector, the slide may produce unsatisfactory projections in the micro highway map projector herein described, unless it conforms with certain requirements to yield acceptable resolution.

For example, the optimum reduction from an ordinary folded highway map the micro highway map slide is preferably in the range of 8:1 to 15:1. Lettering of 5 point or smaller (projected) size should preferably be black for better readability when projected. Red or blue colored printing of 3 to 4 point (projected) size tends to be fuzzy and illegible. On the other hand, field colors project onto the screen very well and enable the driver to readily identify green park areas, blue water areas and yellow urban areas.

The magnification of the tiny region selected from the micro highway map for viewing by the driver should preferably be in the range of about 40× to 100×. At magnifications above 150× printed letters and lines depicting roads become difficult to read because of graininess. Above 200× magnification the map becomes indistinct. These ranges are substantially lower than those encountered with ordinary laboratory microscopic projection systems in which magnifications of 600×, 900× and 1200× are employed to show details of specimens.

Magnifications of more than 100× also fill the screen with too minute an area to facilitate orientation of the driver and rapid identification of highways. Magnification of less than 25× requires too large a micro highway map slide to cover a reasonable area. In order for a vehicle drive with 20/20 vision to comfortably and quickly read the projected image of the map on the vehicle dashboard or a portable screen when his eyes are about 20 inches from the plane of the screen, the overall ratio of screen image to original typical unfolded gasoline station map or road atlas map size should be at least 2:1. In other words, the product of the reduction factor (RF) from paper map to the micro highway map times the projection magnification factor (PMF) must be greater than 2 for optimum readability. Thus, $RF \times PMF > 2$.

The tiny region of the micro highway map within the optical projection field must project the map image onto the vehicle screen which the driver wants to see; and as described hereafter it will be seen that the driver can rapidly and easily select any desired area of the map for viewing, and move the displayed area to follow highways on the map.

Figure 9:
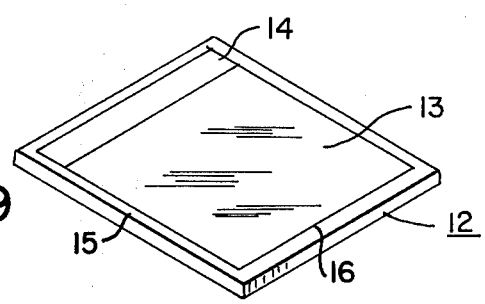
FIG. 9 shows a map slide utilized in the system of the present invention.

As shown in FIG. 9, the display system of the present invention utilizes a replaceable map slide 12 having a large area comprising a road map 13, an elongated strip comprising a location list 14, a series of X-position indicia 15 along one edge of the slide, and another series of Y-position indicia 16 along another edge of the slide perpendicular thereto.

Figure 10:
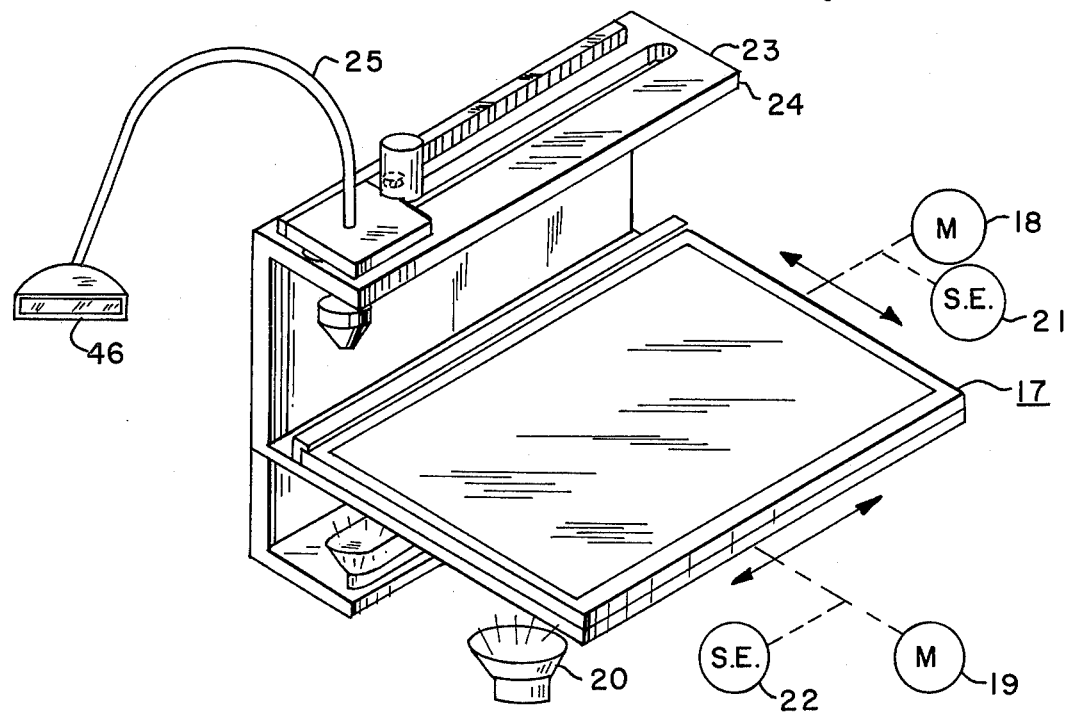
FIG. 10 is a perspective view of the slide holder employed in the map display system of the invention.

The slide 12 is mounted into the slide holder 17 shown in FIG. 10, and secured thereto by any suitable means, e.g. one or more resilient spring clips (not shown).

As shown in FIG. 10, the slide holder 17 is moved in one coordinate direction by an X-position motor 18; and in an orthogonal coordinate direction by a Y-position motor 19. Alternatively or additionally, manually operated pinions may be used to move the slide holder 17. A projection lamp 20 is disposed below the open portion of the slide holder 17 (into which the slide 12 is to be placed), for projecting onto a screen a magnified image of part of the map on the slide.

Shaft encoders 21 and 22 are coupled to the motors 18 and 19 respectively, for providing digital output signals corresponding to the X and Y direction coordinate positions of the slide holder 17. Alternatively, these positions may be determined by optically detecting the indicia 15 and 16 (see FIG. 9) on the corresponding edges of a slide 12 installed in the holder 17. Alternatively, digital X and y position signals may be entered by means of a conventional keyboard, displayed, and employed to position the slide holder 17.

A location list scanning subassembly 23 is mounted on the slide holder 17 with an upper shelf 24 thereof disposed parallel to and above one edge of the slide holder 17, i.e. the edge adjacent to the location list 14 of a slide inserted therein. A fiber optic light conduit 25 is secured adjacent one end to a reciprocating carrier 26, which has a guide pin (not shown) extending into a slot 27 through the shelf 24. The fiber optic cable 25 extends through the slot 27, and terminates below the shelf 24 in an optical lens arrangement 28, for optically coupling an item of the list of locations on the portion 14 of slide 12, to a location display screen.

A scan motor 29 is mounted on the carrier 26, and has a driven gear 30 which is rotatable by the motor 29 in engagement with a gear rack 31 secured to the upper surface of the shelf 24, for reciprocating the carrier 26 along the slot 27, to scan selected items of the list on the slide 12. Illumination for the display of list items is provided by a line projection lamp 32, mounted on an L-bracket 33 extending below the location list part 14 of the slide 12.

Figure 3:
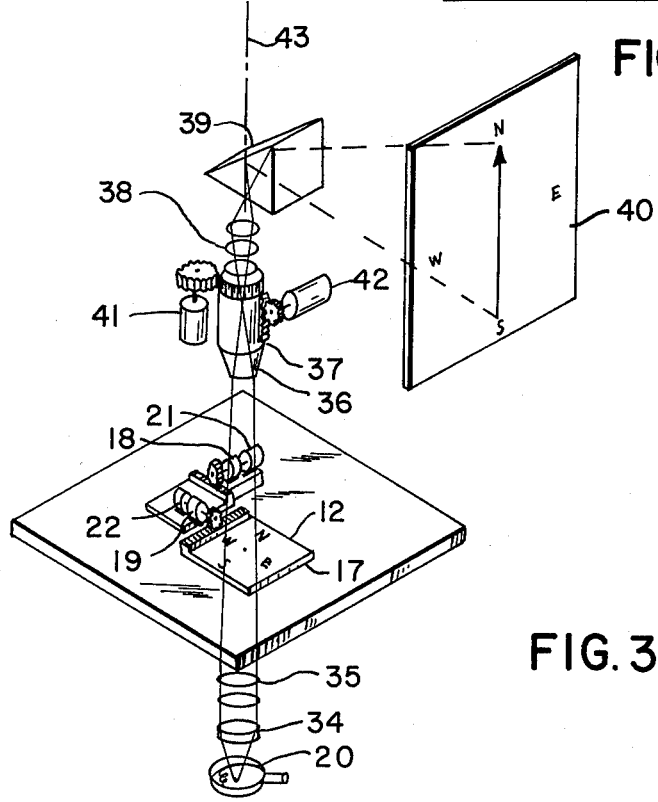
FIG. 3 shows the slide holder position control arrangement, and the optical system of the map display.

As shown in FIG. 3, light from the projection lamp 20 passes through an infra-red heat filter 34, condensing lens 35, a selected part of the map on the slide 12, objective lens 36 mounted at one end of a vertically movable tube 37, zoom magnifying lens 38 mounted at the other end of the tube 37, and prism 39, and thereafter impinges upon the screen 40 to project an image of the selected portion of the map thereon.

A zoom motor 41 operates the zoom lens 38, and a focus motor 42 moves the tube 37 toward and away from the slide 12, to provide focusing action.

Figure 11:
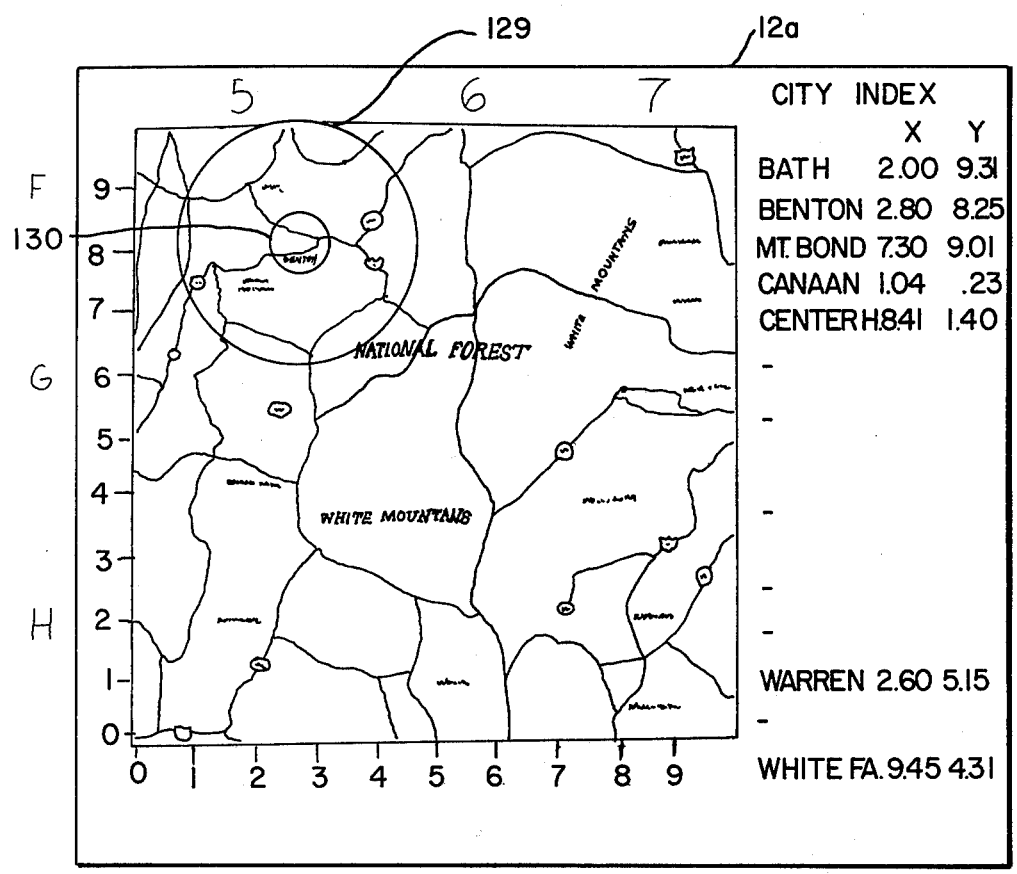
FIG. 11 shows a map display according to a alternative embodiment of the invention.

FIG. 11 shows a slide 12a containing a micro road map with X and Y coordinates and a city index printed thereon. The circles 129 and 130 in FIG. 11 show the relative map areas covered at the extremes of operation of the zoom lens 38, i.e. preferably about a 4:1 area range.

If desired, the screen 40 may be pivotably mounted for rotation about the vertical optical axis 43, to enable the driver of the vehicle in which the map display system is installed, to position the screen at a desired viewing angle.

The entire display unit may be installed in a console adjacent to the driver's position, as best shown in FIG. 4, with a horizontal slot 44 in the right side of the console 45, for insertion and removal of the slide 12. Alternatively, the unit may be installed behind and under the dashboard with the screen visible to the driver and the controls readily available to him.

Figure 7:
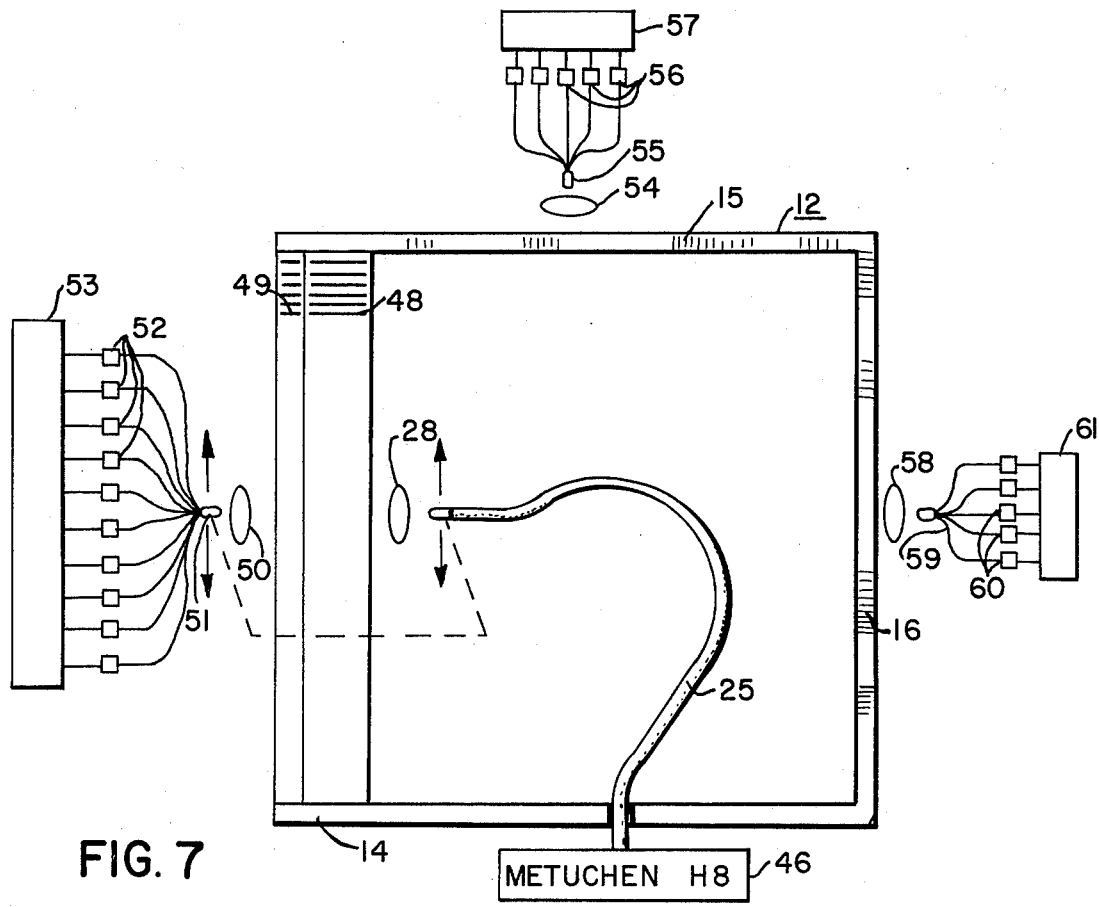
FIG. 7 illustrates the manner in which location and slide position information is optically derived from the map slide.

The end of the fiber optic cable 25 (FIG. 8) opposite the lens 28, is connected to a location display screen 46, as shown in FIGS. 1, 7 and 10. The flexible fiber optic cable 25 permits a relatively economical location display arrangement, while accommodating the movement of the carrier 26 along the location list 14 of the slide 12.

Figure 2:
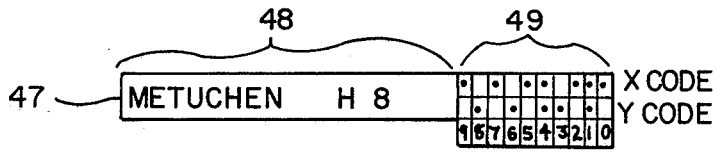
FIG. 2 is an enlarged view showing one item of a list of locations contained on a map slide for use in said system.

Each item 47 of the location list 14, as best shown in FIG. 2, comprises an alphanumeric location description 48 which appears on the screen 46, and a binary encoded section 49 adjacent thereto. The alphanumeric display section 48 contains the name of the location and the conventional road map location designation thereof, i.e. "H-8" as shown in FIG. 2, for designating alphabetical and numerical coordinates. Corresponding X and Y position coordinates (more accurately specified than the displayed coordinates) are optically encoded in the form of light and dark image areas in the region 49. These optical coordinate position code enable precise positioning of the slide holder 17 (and the slide 12 mounted therein), to center the desired location on the screen 40, as will be hereafter described.

Figure 8:
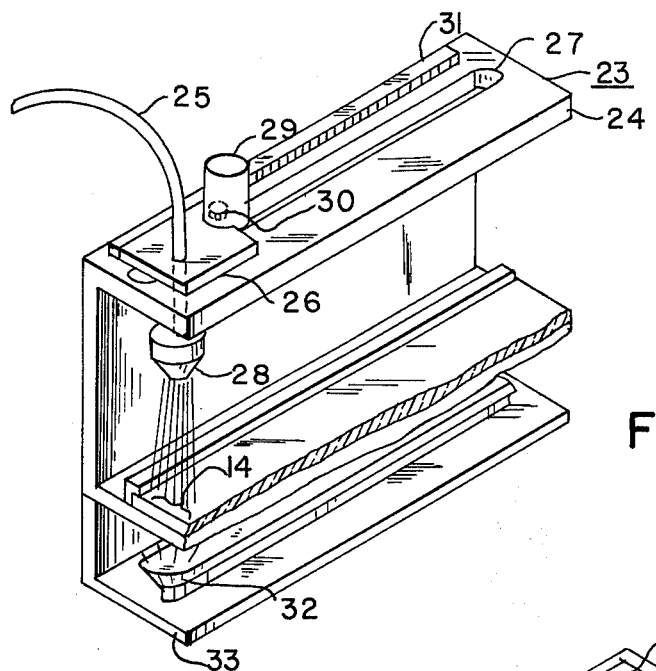
FIG. 8 is a partially cut away perspective view of a portion of the slide holder, illustrating the optical scanning arrangement for the location list on the map slide.

As best shown in FIG. 7, the X and Y optical coordinate position codes in the area 49 of the location item 47, are decoded by means of a lens 50 parallel to and mechanically connected with the lens 28, and an adjacent multifilament fiber optic cable 51 having its adjacent end connected to and movable with the end of the fiber optic cable 25, i.e. with the ends of both cables being secured to and moved by the carrier 26 (FIG. 8).

The multifilament cable 51 is arranged so that at least one filament thereof is in a position to sense each light or dark image area of the X position and Y position codes in the region 49 of the item 47. The opposite end of each of these filaments is connected to a corresponding one of the photodetectors 52, with the outputs of all of said photodetectors coupled to a decoder 53 for providing, in digital form, X and Y coordinate position codes corresponding to the position on the slide 12 at which the location 47 appears.

If desired, instead of employing the shaft encoders 19 and 21 (FIGS. 3 and 10) to monitor the position of the slide holder 17, the movement of the slide holder 17 and slide 12 mounted therein may be monitored (for servomechanism control purposes) by employing multifilament fiber optic sensing arrangements similar to that utilizing the cable 51, for providing digital codes corresponding to the X and Y positions of the slide 12.

As shown in FIG. 7, the X position code is then derived via a lens 54, multifilament fiber optic cable 55, photodetectors 56, and X position decoder 57. Similarly, the Y position code is provided by a lens 58, multifilament fiber optic cable 59, photodetectors 60, and decoder 61.

The map display system of the present invention has three principal modes, viz. (i) a manual mode in which a "joy stick" 61 moves the image of the map portion 13 of the slide 12 in various compass directions; (ii) a location display mode in which the single pole, double throw, center off spring-loaded slew switch 62 operates the motor 29 (FIG. 8) to cause the carrier 26 to move along the list 14, to display a desired location on the screen 46, and the slide 12 is subsequently positioned (either momentarily or continuously, depending upon the position of the momentary-hold switch 63) so that the selected location appears at the center of the screen 40; and (iii) an auto track mode in which series of locations corresponding to a desired travel itinerary are stored by means of pushbuttons A through G and said locations are successively displayed by moving the slide 12 accordingly, as the automobile traverses the corresponding route.

Figure 4A:
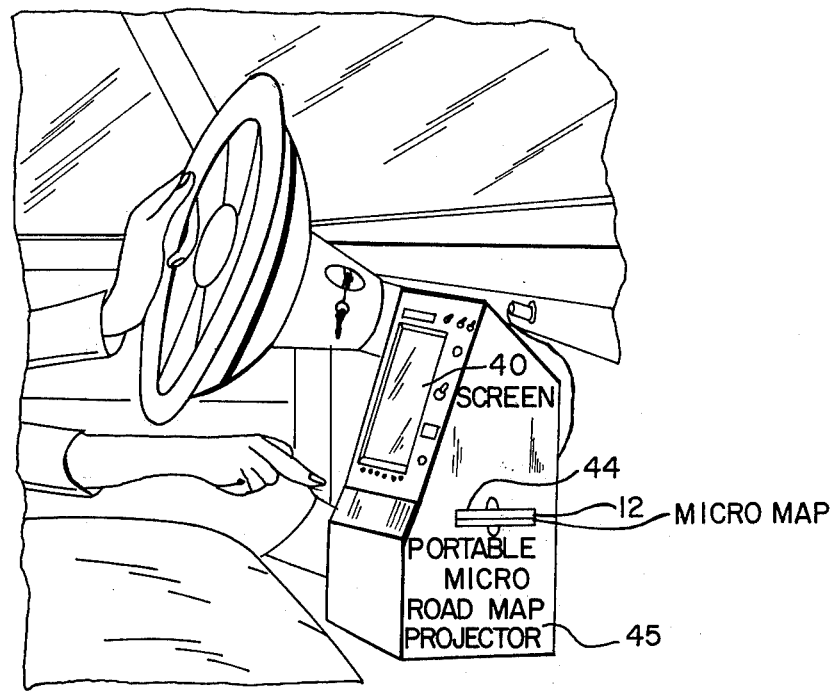
FIG. 4a is a perspective view showing the installation of the map display system in an automobile.
Figures 4B, 4C:
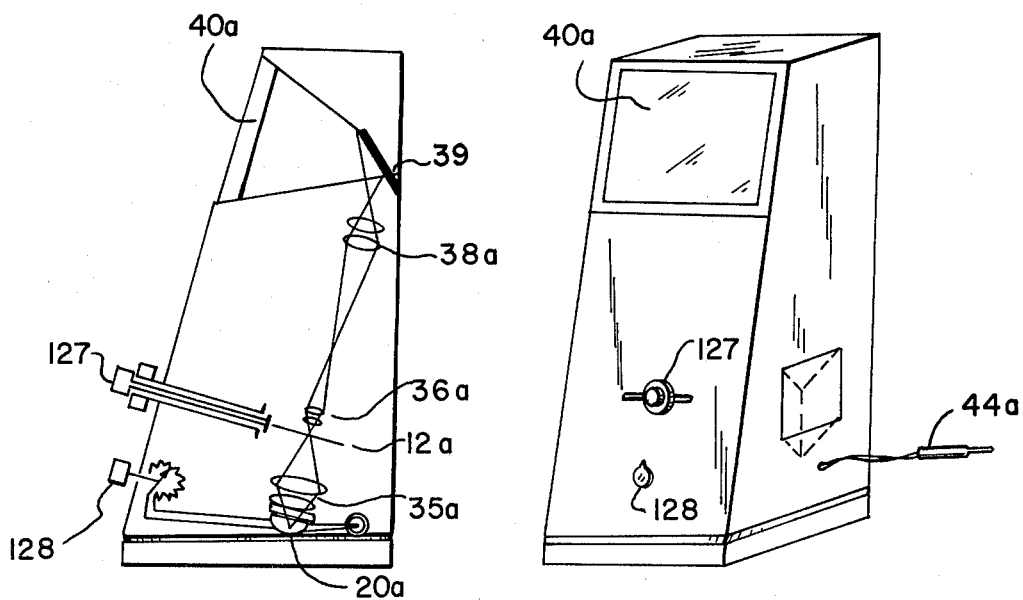
FIG. 4b is a right side cross-sectional view of an alternative console arrangement in a motor vehicle.
FIG. 4c is a perspective view of the console arrangement of FIG. 4b.

The system may also be provided with an elementary mode wherein the motors 18 and 19 are supplemented or replaced by two pinions which can be manually operated to move the slide with the micro road map in X and Y coordinate directions; and the zoom motor 41 and focus motor 42 are likewise replaced by manually operated pinions. Note FIGS. 4b and 4c, wherein a manual positioning control 127 is provided for such a purpose. Also provided in FIGS. 4a and 4b is a variable on-off display illumination control 128, which varies the light output of the projection lamp 35a. The numbering of the elements of FIGS. 4a and 4b corresponds to that of similar elements in other figures, with the designation "a" thereafter.

A mode switch 64 selects the auto track or manual mode, either of which modes may be interrupted at any time by operating the location display switch 63 to display a desired location shown on the screen 46. Thereafter the switch 64 may be momentarily moved to the resume position to return the display to the auto track or manual mode, i.e. whichever mode the display was in prior to interruption by the operation of the display location switch 63.

At any desired time, the present position of the automobile may be stored by operating the joy stick 61 to place said present position under the cross hairs 65 at the center of the screen 40 and then depressing the present position set button 66. Thereafter the distance from the thus set present position of the automobile to whatever location is at the center of the screen 40, i.e. under the cross hairs 65, is computed and displayed in the distance to location digital readout 67.

Figure 6:
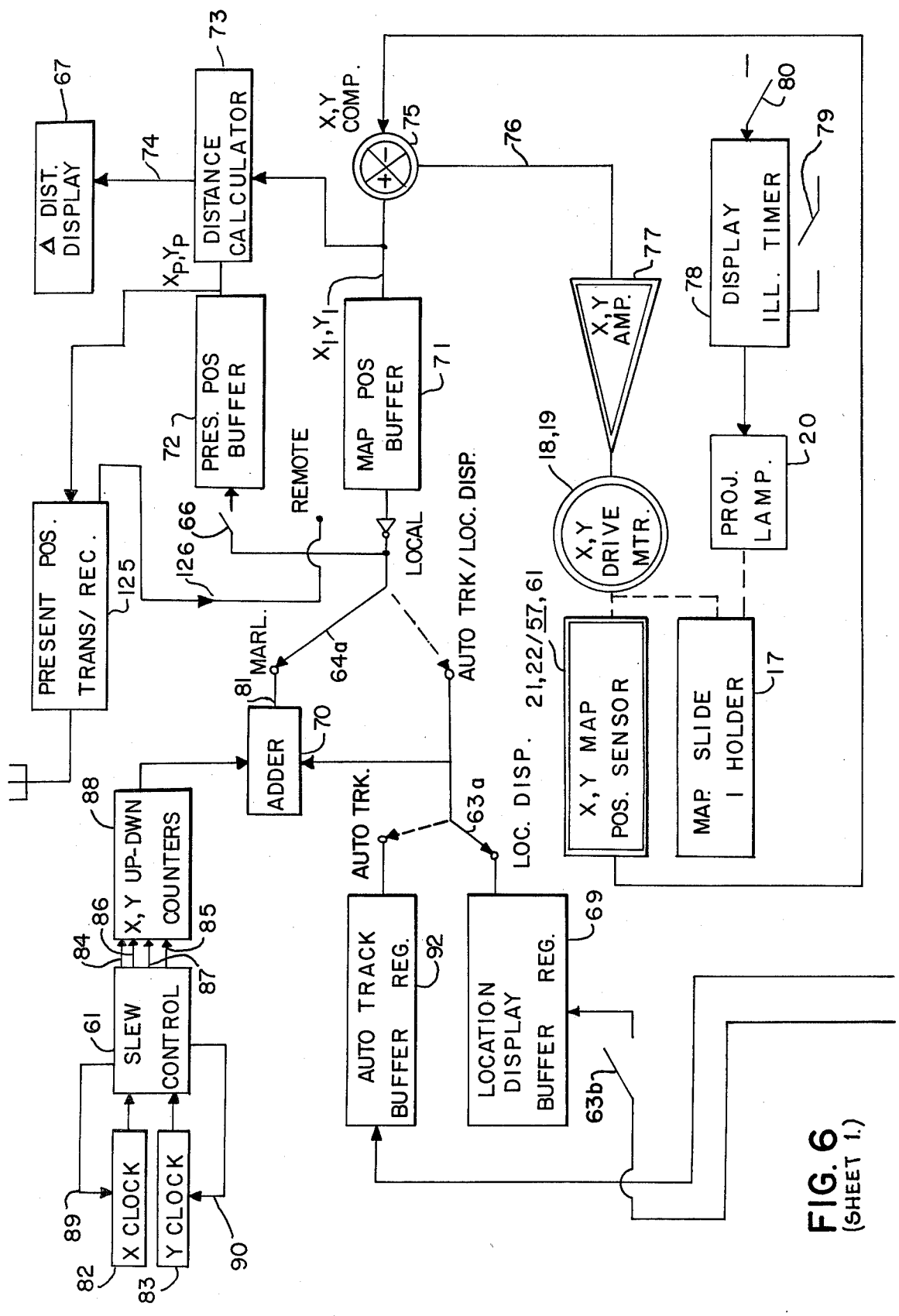
FIG. 6 is a functional block diagram showing the control system for the map display.

The manner in which these various modes operate will be better understood by reference to FIG. 6, which shows a functional block diagram of the control circuitry for the display system.

In the location display mode of operation, the index decoder 53 provides X and Y coordinate position codes to the X, Y index register 68, which stores codes corresponding to the location of the item being displayed on the screen 46 (FIG. 1). When the display location switch 63 is actuated away from its center off position (in either direction), the switch 63b is momentarily closed, storing the coordinates of said location in the location display buffer register 69. The output of the register 69 is coupled through selector switch 63a to an adder 70, and through selector switcher 64a to (i) a map position buffer register 71 and (ii) through present position set switch 66 to a present position buffer register 72.

The outputs of the buffer registers 71 and 72 are coupled to a distance calculator circuit 73, which continuously integrates the incremental X and Y coordinate differences between the outputs of said buffer registers, to provide an output signal to the display 67 on lines 74 corresponding to the distance which the point on the map initially situate at the center of the display has moved from the time the present position set switch 66 was last depressed.

The operation of the distance calculator circuit 73 is conventional, and well known in the art. This circuit may be analog or digital in nature, and operates by continuously determining the incremental change in X direction and Y direction movement, determining the corresponding incremental distance change according to the square root of the sum of the squares thereof, and integrating said distance changes to provide an output signal equal to the distance traversed.

The output of the map position buffer register 71 is coupled to an X, Y comparator 75, which may comprise either two separate comparators for the X and Y servomechanisms, or a single time-shared comparator. The comparator 75 generates X coordinate and Y coordinate error signals on lines 76 indicative of the difference between the output of the map position buffer 71 and the corresponding X and Y slide position coordinates, as determined by the signals provided by the shaft encoders 21 and 22 or the optical decoders 57 and 61.

The error signal on line 76 drives X and Y servomechanism amplifiers 77, the outputs of which are coupled to corresponding X and Y slide holder drive motors 18 and 19.

The X and Y coordinate servomechanism slide holder drive loops comprising amplifiers 77, drive motors 18, 19, map position sensors 21, 22 (or 57, 61) and comparator 75, drive the slide holder 17 so that the intersection of the X and Y coordinates corresponding to the output of the map position buffer 71, is disposed beneath the cross hairs 65 (FIG. 1).

The duration of the display, i.e. the time period during which the display is illuminated, is controlled by a display illumination timer circuit 78, the output of which is coupled to the projection lamp 20. The illumination timer 78 is provided with a signal from the ignition switch 79 of the automobile, which indicates whether or not the ignition is turned on; and a momentary signal from the display actuate pushbutton 80 which is depressed by the driver or operator of the display when the ignition is turned on.

The operation of the display illumination timer 78 is such that when the ignition is not turned on (or is in the accessory position), the map display is continuously illuminated; and when the ignition switch 79 is on, the display is illuminated for a period of no more than 5 seconds each time the display actuate switch 80 is depressed. By so limiting the time the map display is illuminated, the risk of distracting the driver and taking his eyes off the road for an unsafe period of time, is minimized.

In the manual mode of operation, the switch 64a is moved to the manual position, so that the output of the adder 70 on line 81 (rather than the output of the location display buffer register 69) is coupled to the buffer registers 71 and 72.

In this manual mode, the slew control 61 couples pulses from the X clock and Y clock oscillators 82 and 83 on line 84 and 85 respectively, and provides direction count signals on lines 86 and 87 to the X, Y up-down counters 88. The slew control 61 also provides frequency control signals to the clocks 82 and 83 on lines 89 and 90 respectively.

Thus, the relative frequencies of the outputs of the X and Y clocks are determined in accordance with the position of the joy stick 61, to cause the X, Y up-down counters 88 to count at relative rates so that the resultant vector is oriented in the same direction as the joy stick 61. If desired, the slew control 61 can be replaced by a set of manually operated controls for providing the signals on lines 84, 85, 86, 87, 89 and 90.

The signals on lines 89 and 90 are preferably provided by a resolver or similar device or circuit within the slew control 61, coupled to the control handle 91 thereof.

The X, Y up-down counters 88 thus provide X and Y incremental outputs which are algebraically added to the output of the buffer register 69, with the resultant output signal on line 81 varying in accordance with the operation of the slew control 61, to control the map display via the map position buffer 71.

In the auto track mode, the coordinate information for controlling the slide holder 17 is obtained from the auto track buffer register 92, in substantially the same manner as previously described in connection with control by the location display buffer register 69. In the auto track mode, manual operation is provided in precisely the same manner as described above.

Figure 5:
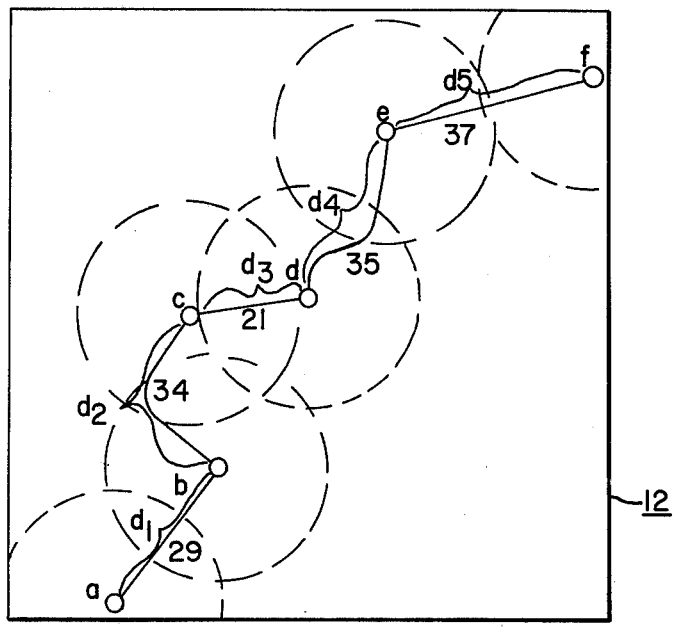
FIG. 5 is a schematic drawing of the map portion of a slide, illustrating the auto track feature of the invention.

The overall operation of the auto track mode is illustrated in FIG. 5, wherein a series of successive cities, towns or other locations to be traversed during an automobile trip are designated by letters a, b, c, d, e and f. The circular area around each location indicates the approximate region of projection on the screen 40. In order to most effectively display the portion of the map surrounding each location of the travel itinerary, the distance traveled by the automobile is constantly compared to the distance to each location, and the corresponding location is displayed at the center of the screen 40, at a time when the automobile has traversed half the distance to said location from the next preceding location.

Thus, in operating the system in its auto track mode, the driver moves the up-down index slew switch 62 to display the first desired location on the screen 46, and then presses the first itinerary pushbutton A. Thereafter the driver successively displays the various locations he will traverse during his trip, on the screen 46, and presses corresponding ones of the itinerary pushbuttons B, C, etc.

As seen in FIG. 6, the result of these operations is to store in the registers 93 to 97 (corresponding to pushbuttons A through E) the X, Y coordinates of each of the locations to be traversed. Of course, as many additional registers as are desired can be provided, with seven registers being required if the seven itinerary pushbuttons shown in FIG. 1 are all to be utilized.

The outputs of each of the registers 93 to 97 are coupled through a single pole, 5 position rotary switch controlled by a stepping relay 98, with the output of the rotary switch coupled to the input of the auto track buffer register 92. Thus, as the stepping relay 98 is stepped through its various positions in response to pulses on line 99, the content of the auto track buffer register 92 successively corresponds to the contents of the registers 93 to 97 respectively.

Thus, if the pulses 99 to the stepping relay 98 are generated at times when the automobile is half-way between the designated locations, the output of buffer register 92 controls the map display to position the map at the desired itineary coordinates.

The control pulses on line 99 to the stepping relay 98 are provided by an OR gate 100, the inputs of which are derived from a series of four comparators 101 to 104.

One input of each comparator is provided by the output of the digital trip counter 105 on lines 106, which output corresponds to the distance travelled by the automobile since the beginning of the trip. The distance travelled information for the trip counter 105 is provided by an automobile odometer 107 on line 108. A reset signal on line 109 sets the trip counter 105 to zero at the beginning of the trip.

The other input to each of the comparators 101 to 104 corresponds to a distance travelled since the beginning of the trip, which would place the automobile half-way between the location to be displayed and the next preceding location on the itinerary, as said locations are stored in the registers 93 to 97 respectively.

The outputs of the registers 93 to 97 are coupled to a "travel distance between locations" read only memory ("ROM") 110, which has stored therein the actual automotive travel distance between locations (not necessarily the straight line distance therebetween). These travel distances between locations designated by the registers 93/94, 94/95, 95/96 and 96/97 are provided as interlocation distance output signals $d_1$, $d_2$, $d_3$ and $d_4$ respectively, with the read only memory 110 being operated to provide all of said outputs under the influence of multiplex control signals 111. Alternatively, four separate read only memories could be employed to provide the aforementioned interlocation distances.

The comparator 101 contains a digital numerical divider circuit 101a, with similar divider circuits 112a, 113a and 114a disposed within the numerical adder circuits 112, 113 and 114 respectively.

The comparator 101 provides an output pulse on line 115 when the output of the trip counter on line 106 is equal to one-half $d_1$. The output of the adder 112 on line 116 has a value equal to $d_1$ plus one-half $d_2$, and the comparator 102 provides an output pulse on line 117 when the output of the trip counter on line 106 indicates the automobile has traversed a distance equal thereto.

The output of the adder 112 on line 118 is coupled as an input to the adder 113, which provides an output on line 119 corresponding to $d_1$ plus $d_2$ plus one-half $d_3$, and an output on line 120 corresponding to $d_1$ plus $d_2$ plus $d_3$, which is coupled as an input to the adder 114.

A pulse is generated by the comparator 103 on line 121 when the signal on line 119 corresponds to the output of the trip counter on line 106. Similarly, the comparator 104 provides an output pulse on line 122 when the automobile has traversed a distance placing it half-way between the location stored in the register 97 and that stored in the register 96 corresponding to the next preceding location of the itinerary.

Thus the contents of the auto track buffer register 92 initially corresponds to the contents of the A register 93, and changes to the contents of the B register 94 when the automobile has traversed a distance placing it half-way between the A and B locations. Similarly, successive locations are displayed on the screen 40 when the automobile reaches the half-way point between the corresponding location and the next preceding location.

Instead of employing discrete, digital logic circuitry as described above, a suitably programmed microprocessor may be utilized to perform many of the control functions. Alternatively, analog circuitry may be employed.

If desired, the intensity of the display may be varied manually, or by means of a photosensor to provide proper illumination for the day and night driving conditions.

The contents of the present position buffer 72 may, if desired, be transmitted to a remote location such as a taxi dispatch center or emergency vehicle control center, by a suitable data link transmitter/receiver 125, thus keeping the control center advised from time to time as to the present position of the vehicle. The transmitter/receiver 125 may also receive X and Y coordinate control signals from said center, and couple the same to the map position buffer on line 126, to cause the map screen to display the command location to which the driver of the vehicle is to proceed.

I claim:

1. A micro highway map projection system for displaying on a viewing screen in an automobile a greatly enlarged image of a minute area of a map, means for continuously moving the map to follow a highway across the entire map, manually operable means for storing data respecting an initial location of said automobile with respect to said map, and means for continuously computing and displaying the distance from said initial location to another location on said map displayed on said viewing screen.

2. The projection system according to claim 1, further comprising zoom projection means for continuously varying the magnification of said minute area on said screen.

3. The projection system according to claim 2, wherein said magnification is in the range of 25× to 150×.

4. The projection system according to claim 2, wherein said magnification is in the range of 40× to 100×.

5. The projection system according to claim 1, further comprising illumination control means for varying the brightness of said enlarged image.

6. The projection system according to claim 1, further comprising means for continuously varying the tilt angle of said screen with respect to the angle of view of a viewer within said automobile.

7. The projection system according to claim 1, further comprising means coupled to said map moving means for transmitting to a remote station a digital code corresponding to the location corresponding to a portion of said minute area of said map.

8. The projection system according to claim 7, wherein said portion is the center of said minute area.

9. The projection system according to claim 1, wherein said map includes a list of cities thereon, and an X, Y coordinate designation of the location of each city on the map.

10. The projection system according to claim 1, wherein said means for moving the map comprises motor means, and manually operable control means for causing said motor means to move the map to a desired position.

11. The projection system according to claim 10, wherein said control means comprises a single control member capable of causing movement of said map in any desired direction.

12. The projection system according to claim 10, further comprising means for storing X, Y coordinate codes corresponding to a plurality of desired positions of said map, and additional control means for causing said motor means to move the map to selected ones of said plurality of desired positions.

13. In combination, a micro road map transparency including X, Y coordinate disignating machine readable code symbols corresponding to the positions of the centers of minute areas located thereon, means for displaying names associated with said symbols and said positions, and means responsive to said code symbols for projecting said minute areas onto a screen so that the centers of said minute areas lie on the optical axis of projection.

14. A micro road map projection system for displaying on an automobile viewing screen a greatly enlarged image of a minute area of a map by reference to an arbitrary coordinate index, including control panel positioning means for centering any city located in the area projected onto the screen from the map, and means coupled to said map for simultaneously displaying the name of said city, and for digitally displaying the coordinates corresponding to said city.

15. A map display system, comprising a slide holder into which a translucent slide may be removably inserted; a slide for mounting in said holder, said slide comprising a greatly reduced translucent microhighway or microstreet map encompassing a large area; control means for positioning and centering any minute region of the map and for continuously moving the map in order to display highway and street details traversing adjacent regions thereof; a display screen; optical projection means for displaying a greatly magnified image of said minute region on said screen, manually operable means for storing data respecting an initial location of said automobile with respect to said map, and means for continuously computing and displaying the distance from said initial location to another location on said map displayed on said viewing screen.

16. A map display system for a motor vehicle, comprising:
a slide holder for a slide having (i) a map portion comprising a projectable highway map and (ii) an index portion comprising a projectable list of locations and an optical coordinate position code corresponding to each location of said list;
coordinate control servomechanism means for positioning said slide holder in accordance with X-position and Y-position coordinate control signals;
optical map projection means for displaying on a first screen a magnified image of a selected part of the map portion of said slide;
optical index projection means mounted on said slide holder for displaying on a second screen a magnified image of at least one selected item of said list of locations;
index decoding means optically coupled to said index portion of said slide and responsive to said coordinate position code for generating X-position and Y-position coordinate designation signals coresponding to said selected item;
an index register for storing said coordinate designation signals; and
means coupled to said index register and operative in a location display mode of said system for generating said coordinate control signals to cause said slide holder to move to a position in which a location corresponding to said selected item of said list is displayed on said screen.

17. The system according to claim 16, wherein said index projection means includes scanning means for sequentially displaying successive items of said list on said second screen.

18. The system according to claim 16, wherein said index projection means includes a flexible fiber optic cable for coupling said selected item of said list to said second screen.

19. The system according to claim 16, wherein said coordinate position code is a binary code comprising relatively light and dark image areas, and said index decoding means includes a multifilament fiber optic element having at least one filament optically coupled to each of said areas.

20. The system according to claim 16, further comprising slew control means for manually varying said coordinate control signals to cause said slide holder to move to a desired position.

21. The system according to claim 16, further comprising timing means for limiting the duration of operation of said optical map projection means.

22. The system according to claim 16, further comprising:
a trip counter for generating a vehicle distance travelled signal indicative of the distance travelled from a starting point by the vehicle in which said system is installed;
means for selecting from said list and storing coordinate designation signals corresponding to each of a plurality of locations to be traversed by said vehicle during a trip;
means responsive to said stored coordinate designation signals for generating a plurality of interlocation distance signals corresponding to the distance of each of said locations from said starting point; and
means operative in an auto track mode of said system for comparing said distance travelled signal with each of said stored coordinate designation signals, and generating coordinate control signals corresponding to successive ones of said locations traversed by said vehicle, in response to coincidence of said distance travelled signal with each of said stored interlocation distance signals.

23. The system according to claim 22, wherein each of said interlocation distance signals has a value equal to the distance of the preceding location from the starting point plus one-half the distance between the corresponding location and said preceding location.

24. The system according to claim 16, further comprising means for storing X-position and Y-position coordinate signals corresponding to the present position of said vehicle as shown on said map display, and for computing and displaying the straight-line distance between said present position and another position on said map display.

25. The system according to claim 16, wherein said coordinate control servomechanism means includes means mounted on said slide holder adjacent the periphery of said slide for optically reading therefrom indicia corresponding to the position of said slide holder with respect to said first optical map projection means.

26. A map display system for a motor vehicle, comprising:
- a slide holder for a slide having (i) a map portion comprising a projectable highway map and (ii) an index portion comprising a list of locations and a coordinate position code corresponding to each location of said list;
- optical map projection means for displaying a magnified image of a selected part of the map portion of said slide;
- coordinate control servomechanism means for positioning said slide holder an optical map projection means with relation to each other in accordance with X-position and Y-position coordinate control signals;
- index designating means for designating at least one selected item of said list of locations;
- index decoding means coupled to said index portion of said slide and responsive to said coordinate position code for generating X-position and Y-position coordinate designation signals cooresponding to said selected item;
- an index register for storing said coordinate designation signals; and
- means coupled to said index register and operative in a location display mode of said system for generating said coordinate control signals to cause said slide holder to move to a position in which a location corresponding to said selected item of said list is displayed on said screen.

* * * * *